(12) United States Patent
Meek

(10) Patent No.: US 10,802,171 B2
(45) Date of Patent: Oct. 13, 2020

(54) HIGH RESOLUTION SEISMIC DATA DERIVED FROM PRE-STACK INVERSION AND MACHINE LEARNING

(71) Applicant: Pioneer Natural Resources USA, Inc., Irving, TX (US)

(72) Inventor: Robert A. Meek, Irving, TX (US)

(73) Assignee: Pioneer Natural Resources USA, Inc., Irving, TX (US)

( * ) Notice: Subject to any disclaimer, the term of this patent is extended or adjusted under 35 U.S.C. 154(b) by 350 days.

(21) Appl. No.: 15/965,767

(22) Filed: Apr. 27, 2018

(65) Prior Publication Data

US 2019/0293818 A1    Sep. 26, 2019

Related U.S. Application Data

(60) Provisional application No. 62/491,708, filed on Apr. 28, 2017, provisional application No. 62/532,261, (Continued)

(51) Int. Cl.
*G01V 1/36* (2006.01)
*G01V 1/30* (2006.01)
*G01V 1/28* (2006.01)

(52) U.S. Cl.
CPC ............... *G01V 1/368* (2013.01); *G01V 1/28* (2013.01); *G01V 1/282* (2013.01); *G01V 1/306* (2013.01); *G01V 1/307* (2013.01); *G01V 2210/21* (2013.01); *G01V 2210/324* (2013.01); *G01V 2210/612* (2013.01); *G01V 2210/6161* (2013.01)

(58) Field of Classification Search
USPC ......................................................... 702/17
See application file for complete search history.

(56) References Cited

U.S. PATENT DOCUMENTS 4,964,099 A * 10/1990 Carron ................... G01V 1/282
367/73
5,146,167 A *  9/1992 Strickland ............... G01V 3/28
324/339
(Continued)

FOREIGN PATENT DOCUMENTS

WO          0218976 A1     3/2002

OTHER PUBLICATIONS

Hampson, D.P. et al., "Simultaneous inversion of pre-stack seismic data," Society of Exploration Geophysicist Annual Meeting, Extended Abstracts, 2005, pp. 1633-1638.
(Continued)

*Primary Examiner* — Paul D Lee
(74) *Attorney, Agent, or Firm* — Blank Rome LLP

(57) ABSTRACT

A system and method combines model-based inversion and supervised neural networks to develop high resolution rock property volumes from surface seismic data. These volumes have higher frequency and are calibrated to fit well log data. In addition to rock volumes, a Reflection Coefficient (RC) volume is derived from the acoustic impedance volume. The RC volume has much higher frequency, better lateral continuity, and ties to the well logs better than conventional seismic or frequency enhanced data. By interpreting and mapping with this RC volume, a much more accurate depth model can be built, which allows for a horizontal well to be accurately drilled.

25 Claims, 13 Drawing Sheets
(10 of 13 Drawing Sheet(s) Filed in Color)

Related U.S. Application Data filed on Jul. 13, 2017, provisional application No. 62/629,877, filed on Feb. 13, 2018.

(56) References Cited

U.S. PATENT DOCUMENTS

| | | | | |
|---|---|---|---|---|
| 5,798,982 | A * | 8/1998 | He | G01V 1/306 367/28 |
| 5,838,634 | A * | 11/1998 | Jones | G01V 1/282 367/73 |
| 6,014,343 | A * | 1/2000 | Graf | G01V 11/00 367/38 |
| 6,058,073 | A * | 5/2000 | Verwest | G01V 1/28 367/31 |
| 2009/0175125 | A1 * | 7/2009 | Khan | G01V 1/42 367/43 |
| 2013/0336583 | A1 * | 12/2013 | Ernst | G06T 7/80 382/165 |
| 2014/0102694 | A1 | 4/2014 | Hargreaves et al. | |
| 2016/0349389 | A1 | 12/2016 | Walters et al. | |
| 2018/0292552 | A1 * | 10/2018 | Ramsay | G01V 1/50 |
| 2019/0293815 | A1 * | 9/2019 | Jocker | G01V 1/50 |

OTHER PUBLICATIONS

Hampson, D.P., "Use of multiattribute transforms to predict log properties from seismic data," Geophysics, 2001, pp. 220-236, vol. 66, No. 1.

Bodziak, R. et al., "The role of seismic attributes in understanding the hydraulically fracturable limits and reservoir performance in shale reservoirs: An example from the Eagle Ford Shale, south Texas," AAPB Bulletin, 2014, pp. :2217-2235, vol. 98, No. 11.

Newgord, M. et al., "Bakken Well Performance Predicted from Shale Capacity," Unconventional Resources Technology Conference, Jul. 20-22, 2015, pp. 2591-2598, San Antonio, Texas.

Ye, Hongzhuan, et al., "Improving Wolfcamp B3 Drilling From Geologic Analysis," Unconventional Resources Technology Conference, Jul. 20-22, 2015, pp. 2052-2061, San Antonio, Texas.

Ye, Hongzhuan, et al., Slides for "Improving Wolfcamp B3 Drilling From Geologic Analysis," Unconventional Resources Technology Conference, Jul. 20-22, 2015, pp. 2052-2061, San Antonio, Texas.

Stephens, A. et al., "Mining Eagle Ford rock properties data from 3D seismic in South Texas, using pre-stack inversion and Neural Net technology," 17th Annual RMAG/DGS 3D Seismic Symposium, 2011, Denver, USA.

Stephens, A. et al., Slides for "Mining Eagle Ford rock properties data from 3D seismic in South Texas, using pre-stack inversion and Neural Net technology," 17th Annual RMAG/DGS 3D Seismic Symposium, 2011, Denver, USA.

Russell, B.H., et al. "Simultaneous Inversion of Pre-Stack Seismic Data." 6th International Conference & Exposition on Petroleum Geophysics "Kolkata 2006."

International Search Report issued in counterpart application No. PCT/US2018/030064 dated Aug. 10, 2018.

\* cited by examiner

HIGH RESOLUTION SEISMIC DATA DERIVED FROM PRE-STACK INVERSION AND MACHINE LEARNING

CROSS-REFERENCE TO RELATED APPLICATION

This is a non-provisional applications of 62/491,708, filed 28 Apr. 2017; 62/532,261, filed 13 Jul. 2017; and 62/629,877, filed 13 Feb. 2018, which are each incorporated herein by reference.

BACKGROUND OF THE DISCLOSURE

The development of unconventional reservoirs, such as in the Permian basin, involves the placement of horizontal wells into organic rich shale facies. Horizontal wells must be positioned to avoid hard massive carbonate debris flows, which can damage drill bits and lead to costly trips out of hole. In addition, these tight carbonate facies can act as fracture barriers during hydraulic fracture treatments. As a result, constant refinement of development plans is required. Pre-stack seismic inversion is often used to derive geomechanical properties of a formation to aid in developing a reservoir. Unfortunately, using seismic inversion alone may not be the best solution.

The fields of well-planning, drilling, and production can be improved when engineers have a better understanding of a subsurface formation and can better position horizontal wells. To achieve these goals, the engineers need to obtain high resolution data that is well correlated to the actual depth of the subsurface geology. Current methods just tend to use seismic data alone to improve the frequency and quality of the seismic data.

The subject matter of the present disclosure is directed to overcoming, or at least reducing the effects of, problems surrounding current methods. To that end, the subject matter of the present disclosure is directed to a method to improve temporal resolution and quality of surface seismic data by using a combination of pre-stack inversion and machine learning (e.g., neural network processing). The method uses both seismic pre-stack data and well log data to produce a seismic reflection series that optimally ties the seismic information to information from the wells.

SUMMARY OF THE DISCLOSURE

A method disclosed herein is implemented with processing equipment for imaging a formation for hydrocarbon exploration. The formation has a plurality of wells therein. The method comprises the steps of obtaining seismic records of seismic equipment imaging the formation; obtaining well logs of logging equipment imaging the formation intersected by the wells; and tying the well logs to the seismic records.

In a first iteration, the method comprises filtering one of the well logs, generating first volumes imaging a parameter of the formation using the seismic record and a first model created from the filtered well log, and iteratively updating the first volumes using the well logs of additional ones of the wells. In a second iteration, the method comprises filtering the updated first volumes, generating second volumes imaging a parameter of the formation using the seismic record and second models created from the filtered first volumes, and iteratively updating the second volumes using the well logs of the wells.

The method comprises calculating a reflection coefficient volume from at least an impedance volume of the updated second volumes; and planning a stage of the hydrocarbon exploration of the formation based on the imaging of the formation from at least the reflection coefficient volume.

To obtain the seismic records, the seismic records can be conditioned in a space-time (x, t) domain, and seismic volume can be created by summing the seismic records. To obtain the well logs, the well logs can be edited in a depth domain. To tie the well logs to the seismic record, properties of the well logs acquired in depth can be matched with properties of the seismic records acquired in time. For example, a time-depth table can be created of the well logs tied to the seismic records. To tie the well logs to the seismic records, major horizons can also be interpreted in the seismic records.

In the first iteration, filtering one of the well logs and generating the first volumes using the seismic record and the first model created from the filtered well log can comprise: creating the first model as a first low frequency background model by applying a first bandpass filter to one of the well logs; and generating the first volumes each imaging a parameter of the formation by applying prestack inversion to the seismic records using the first model. Iteratively update the first volumes using the additional ones of the well logs In the first iteration can comprise iteratively refining the first volumes using neural network processing with the additional well logs.

To create the first low frequency background model in the first iteration, the bandpass filter in a range 0/0-10/15 Hz can be applied on the one well log detailed with interpreted horizons and time-depth information. The first volumes can be selected from the group consisting of acoustic impedance, shear impedance, density, P-wave velocity, and S-wave velocity volumes.

In the second iteration, filtering the updated first volumes and generating the second volumes imaging a parameter of the formation using the seismic record and the second models created from the filtered first volumes can comprise: creating the second models as second low frequency background models by applying a second bandpass filter to the updated first volumes; and generating the second volumes each imaging a parameter of the formation by applying prestack inversion to the seismic records using the second models.

To create the second low frequency background models in the second iteration, the second bandpass filter in a range of 0/0-15/20 Hz can be applied on the updated first volumes. Iteratively updating the second volumes using additional ones of the well logs in the second iteration can comprise refining the second volumes for acoustic impedance, shear impedance, density, P-wave velocity, and S-wave velocity by iteratively using a neural network with the additional well logs.

According to the method, calculating the reflection coefficient volume cam comprise applying a broad bandpass filter in a range of 0/0-90/110 Hz to at least an impedance volume of the second volumes.

According to the method, calculating the reflection coefficient volume can comprise applying a reflection coefficient equation to at least the impedance volume including an acoustic impedance volume or a shear impedance volume. The reflection coefficient equation can be defined by:

$$RC = \frac{Zp_2 - Zp_1}{Zp_2 + Zp_1},$$

wherein Zp is acoustic impedance and RC is the reflection coefficient.

According to the method, planning the stage of the hydrocarbon exploration of the formation based on the imaging of the formation from at least the reflection coefficient volume can comprise determining facies of the formation from the geomechanical volumes.

According to the method, planning the stage of the hydrocarbon exploration of the formation based on the imaging of the formation from at least the reflection coefficient volume can comprises determining a trajectory to drill a wellbore in the formation with a directional drilling assembly and can further comprise planning a treatment of one or more zones of the wellbore drilled along the trajectory to exploit hydrocarbons.

A programmable storage device is disclosed herein having program instructions stored thereon for causing a programmable control device to perform a method of imaging a formation for hydrocarbon exploration according to steps of the techniques outlined above.

According to the present disclosure, a system is disclosed for of imaging a formation for hydrocarbon exploration. Again, the formation has a plurality of wells therein. The system comprises an interface and processing equipment. The interface receives seismic records of seismic equipment imaging the formation and receives well logs of logging equipment imaging the formation intersected by the wells. The processing equipment is in operable communication with the interface. The programmable control device is configured to: tie the well logs to the seismic records; in a first iteration, filter one of the well logs, generate first volumes imaging a parameter of the formation using the seismic record and a first model created from the filtered well log, and iteratively update the first volumes using the well logs of additional ones of the wells; in a second iteration, filter the updated first volumes, generate second volumes imaging a parameter of the formation using the seismic record and second models created from the filtered first volumes, and iteratively update the second volumes using the well logs of the wells; calculate a reflection coefficient volume from at least an impedance volume of the updated second volumes; and plan a stage of the hydrocarbon exploration of the formation based on the imaging of the formation from at least the reflection coefficient volume. The programmable control device can be configured to perform additional steps of the techniques outlined above.

The system can further comprises one or more of logging equipment obtaining the well logs imaging the formation intersected by the wells, seismic equipment obtaining the seismic records imaging the formation, and a directional drilling assembly drilling a trajectory of a wellbore in the formation.

The foregoing summary is not intended to summarize each potential embodiment or every aspect of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DISCLOSURE

A. Summary

Figure 1A:
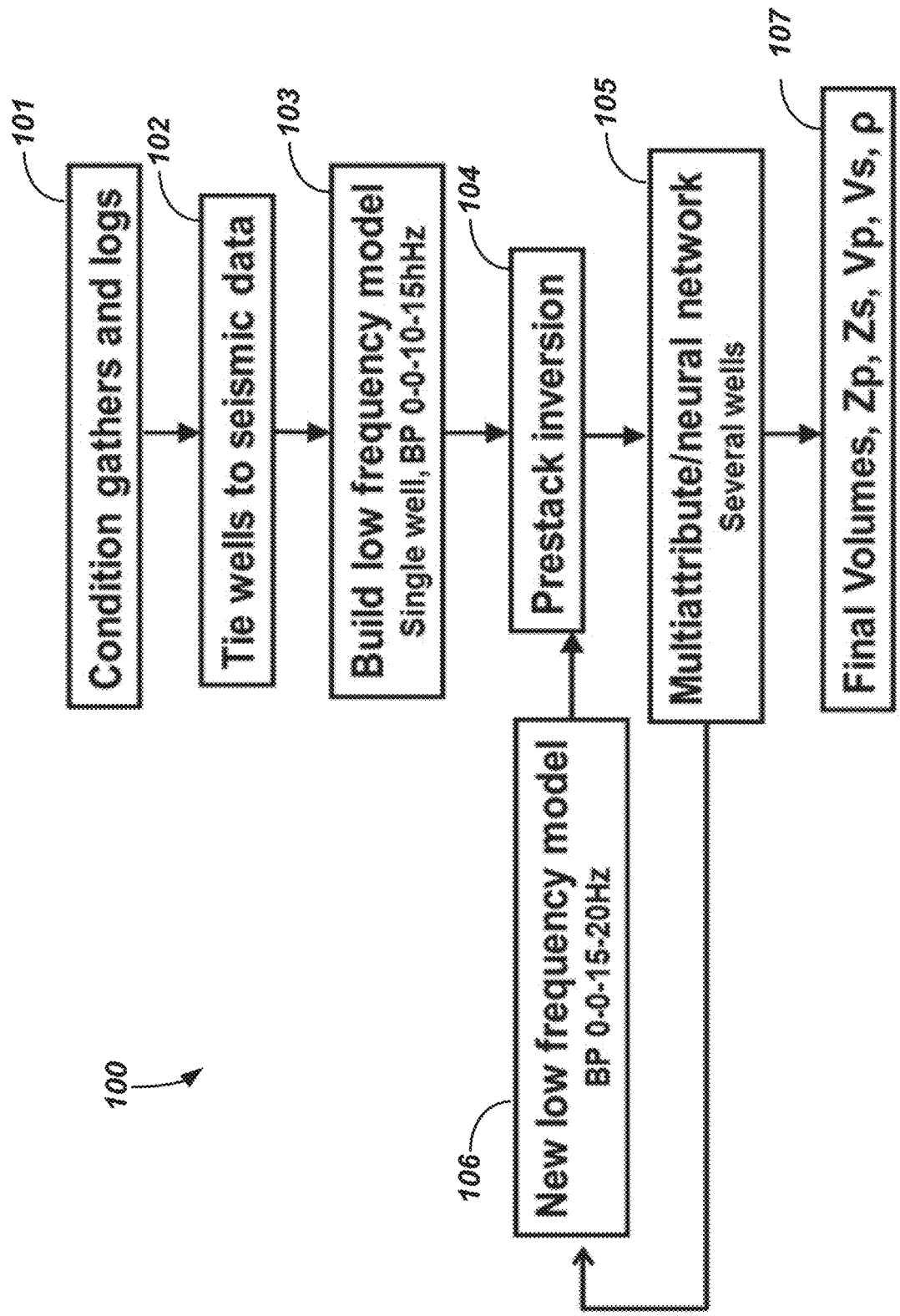
FIG. 1A illustrates a process of deriving high resolution seismic data from pre-stack inversion and machine learning.

An accurate understanding of a subsurface formation is useful in developing a reservoir. For example, the accurate placement and positioning (i.e., geosteering) of a horizontal well in the subsurface volume can be useful in developing an unconventional reservoir, such as in brittle, organic-rich shales. Surface seismic data has been instrumental in accurately positioning such horizontal wells at depth and in avoiding large faults, carbonate debris flows, or other types of hazards.

Although surface seismic data alone may be useful, the teachings of the present disclosure seek to improve engineers' understanding of the subsurface formation to achieve a number of benefits, such as better positioning of horizontal wells in the subsurface formation. Briefly, the teachings of the present disclosure use surface seismic data from a 3-D seismic survey in addition to well logs from pilot wells to further derive a more accurate model of the subsurface formation. To do this, the techniques of the present disclosure use a combination of model-based inversion and supervised neural network processing to develop high resolution rock property volumes from the surface seismic data and well log data.

Pre-stack seismic inversion derives estimates of the rock properties and facies models and helps guide the development of the field. Several rock property volumes can be derived through the disclosed techniques, including volumes of acoustic impedance, shear impedance, P-wave velocity, S-wave velocity, Young's modulus, Poisson ratio, brittleness, and other seismic attributes. These volumes have a higher frequency content and are calibrated to fit the well log data. Carbonate debris flows are preferably mapped because they can influence horizontal drilling and can act as fracture barriers during hydraulic stimulation.

For instance, the rock property volumes can be derived from the surface seismic to map out different types of facies. Pre-stack inversion is used to derive the 3D rock property volumes where the data has a high enough quality to invert. The pre-stack inversion volumes are then combined with neural network processing, such as a multilayer feedforward neural network to further increase the frequency content and correlation to well data. The volumes then can be used to map out facies, such as brittle and ductile zones in shale, using Young's modulus and Poisson ratio. Similar facies results can also be obtained using Young's modulus and density derived from the pre-stack inversion.

In addition to the above steps, the disclosed techniques can use the acoustic impedance volume to derive a reflection coefficient volume, which has a better resolution than what is obtained simply with an input-derived, full-stack volume as traditionally used. For instance, the reflection coefficient volume has a much higher frequency content, better lateral continuity, and ties the well logs better than conventional seismic or frequency enhanced data. By interpreting and mapping with this reflection coefficient volume, a much more accurate depth model can be built. Reflectors that were previously unmappable on conventional seismic data can be mapped so horizontal wells can be more accurately placed.

In the end, the results of the disclosed techniques can be used to design horizontal wells and increase the drilling rate by better placing the wells in brittle organic rich facies, avoiding carbonate debris flows, etc. Additionally, the determined volumes in conjunction with other seismic-derived attributes can be used to derive a shale capacity volume and link it to initial production in the reservoir.

B. Processing Technique

Having a general understanding of the teachings of the present disclosure and some of the goals, discussion now turns to a process 100 according to the present disclosure shown in FIG. 1A. The process 100 is a prestack seismic workflow that creates rock property volumes and uses a combination of model-based inversion and supervised neural network processing.

The process 100 is used on seismic survey data, such as data from a 3D survey, and uses well logs from pilot or associated wells in the seismic region of interest. The process 100 initially conditions seismic gathers of the survey and conditions well logs from the associated wells (Block 101). Preferably, the migrated seismic gathers are flat and conditioned. If the gathers are not flat, a known form of analysis can be used in pre-processing the data. For example, quality control (QC) analysis can preferably be used in processing the data. Trim statics or velocity corrections can be applied to flatten the gathers further, and an angle dependent amplitude correction on the gathers is also used to match amplitudes from synthetic gathers calculated using Zoeppritz' equation.

In addition to pre-processing the seismic data, the well log data is also preferably pre-processed. Some formations can be known for producing washouts in the boreholes. Logs in such a formation would need to be appropriately edited. In addition, spikes and other bad hole conditions are preferably edited in the well logs, and different density well logs are preferably normalized. Neural network processing can also be used to derive some missing well logs, particularly s-wave velocity, in the survey area of interest.

Figure 2A:
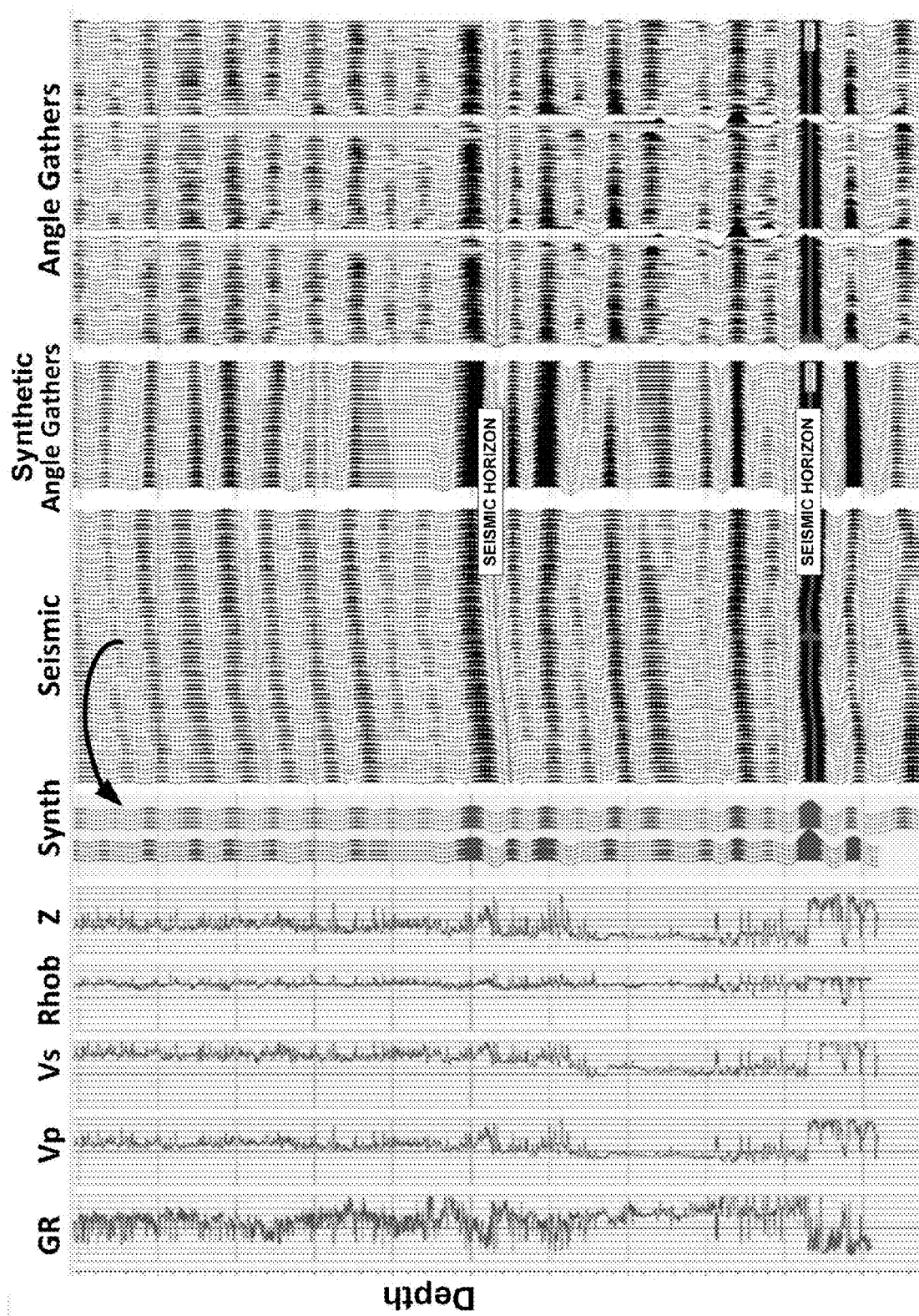
FIG. 2A illustrates details of tying seismic data to well log data.

With the seismic gathers and well logs conditioned, the process 100 ties the well log data to the seismic data (Block 102) so the well log properties acquired in depth can be matched with the seismic properties acquired in time. (FIG. 2A shows example of well logs being tied seismic data. In this example, amplitude scaling is applied to the angle gathers to match up with Zoeppritz angle synthetic gathers. Various seismic horizons are interpreted.)

At this point, one of the main problems in seismic processing (e.g., seismic inversion) is building a low frequency background model from the well logs. Interpolating between the wells and creating such a low frequency background model often results in "bull's eyes" in the data. CoKriging (or Gaussian process regression for interpolation) of the well data with seismic velocities has also been attempted but with poor results.

According to the present disclosure, the process 100 instead goes through iterative steps building up the complexity in interpolating between the wells and creating the low frequency background models (Blocks 103 through 106). To do this, the process 100 starts with a low frequency model based on a single well log and seismic horizons and adds complexity in an iterative fashion with more well logs (Block 103). This assumes that most of the wells in the area are fairly similar. In general, a single well model followed by neural networks is useful where all the wells in the survey are fairly similar. If there is a large lateral facies change, such as from layered local carbonate debris flows in one area of a 3D survey, the single well model may not work as well, and a multi-well low frequency model is more appropriate. However, a technique could be used to handle dissimilarities. In some formations, carbonate debris flows tend to dominate and can create problems in using this process 100 so areas of the reservoir away from carbonate debris flows may need to be of primary focus.

After building the model with the single well, the low frequency model is built using smoothed seismic horizons (Block 103), and a model-based pre-stack seismic inversion using incident angle dependent wavelets is calculated according to an inversion method (Block 104). Any number of available methods can be used to perform the pre-stack inversion. As one example, the pre-stack seismic inversion can follow the teachings outlined in Hampson, D. P. and Russell, B. H., 2005, "Simultaneous inversion of pre-stack seismic data," Society of Exploration Geophysicist Annual Meeting, Extended abstracts, pgs. 1633-1638, which is incorporated herein by reference in its entirety. The prestack inversion produces three independent volumes, including an acoustic impedance volume, a shear impedance volume, and a density volume. A P-wave velocity volume and an S-wave velocity volume are also calculated.

To further increase the temporal resolution, neural network processing can be used (Block 105). Any number of different techniques can be used to perform the neural network processing, such as a multilayer feedforward neural network process using multi-attribute transforms to match the volumes to the well logs.

Figure 2B:
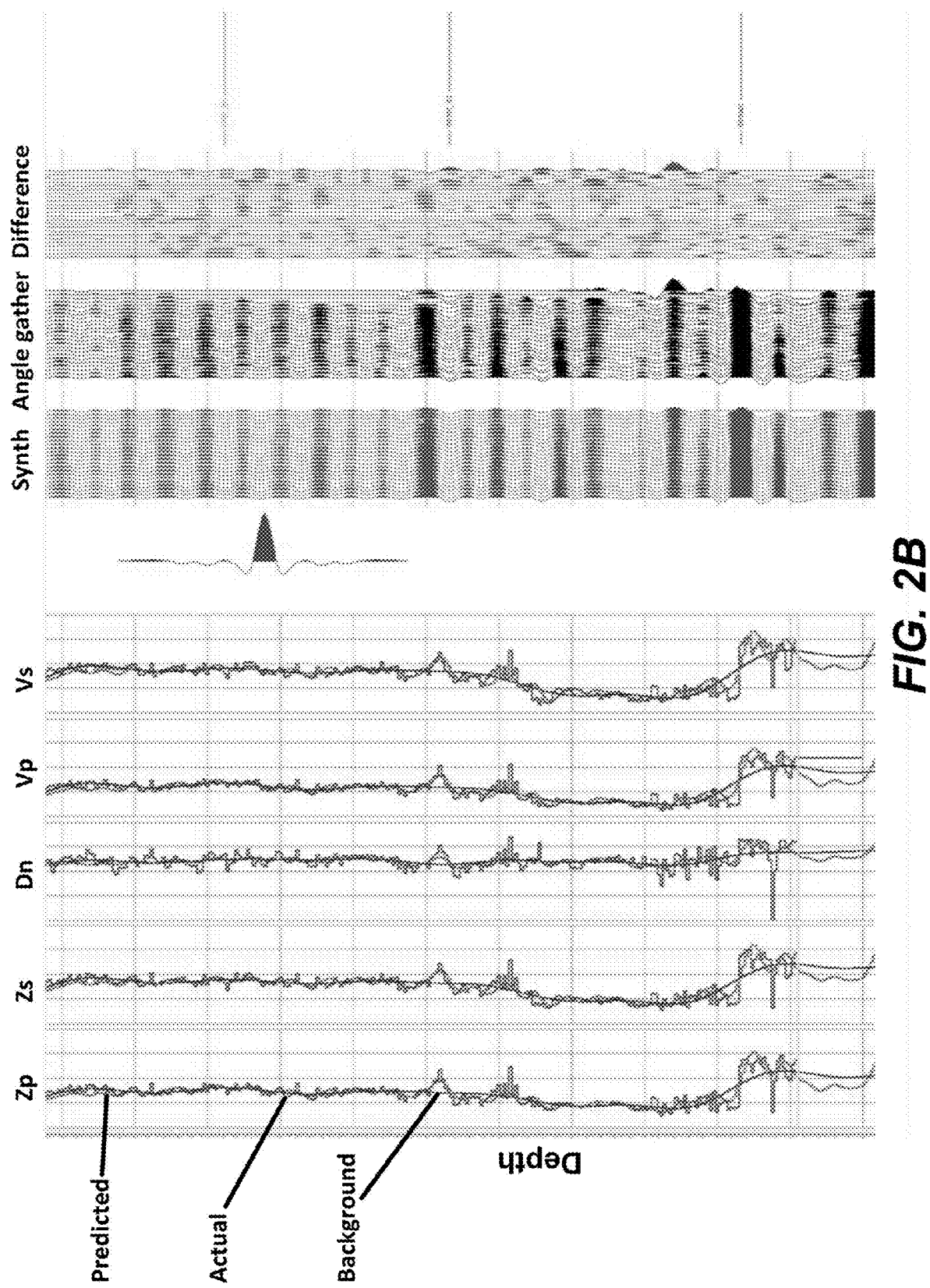
FIG. 2B illustrates details of the inversion analysis.

For reference, FIG. 2B shows details of inversion analysis. In this example, inversion parameters (e.g., Zp, Zs, Dn, Vp, Vs) are adjusted to match a predicted log response from the seismic data with an actual log response.

Information about using multiple attribute transforms to predicted log properties from seismic data can be found in Hampson, D. P., Schuelke, J. S., and Quirein, J. A., 2001, "Use of multiattribute transforms to predict log properties from seismic data," Geophysics, Vol. 66, No. 1, pgs. 220-236, which is incorporated herein by reference in its entirety.

As shown, the process 100 repeats the steps of building the low frequency model (Block 106), performing pre-stack inversion (104), and performing the neural network processing (105) by adding more wells in the subsequent iterations. Ultimately, the process 100 produces final volumes (Block 107). These final volume can include volumes of acoustic impedance (Zp), shear impedance (Zs), P-wave velocity (Vp), S-wave velocity (Vs), and density (p). Additionally, after the inversion of seismic data is completed, the seismic data can be further analyzed by using a reflection coefficient series, as detailed later.

In addition to the inversion volumes, a principle component analysis (PCA) is performed, and volumes are generated for input to a neural network as well as mathematic operations and filters. Once the neural network is trained, it is applied to the volumes to create new volume background models at slightly higher frequencies, as shown in FIG. 1A. This introduces a more realistic spatial variability in the background model rather than well log interpolation. The process is repeated and volumes generated for acoustic properties as well as various geomechanical properties, such as Young's modulus, Poisson ratio, critical strain, and brittleness. These volumes also go through a neural network enhancement.

Figure 1B:
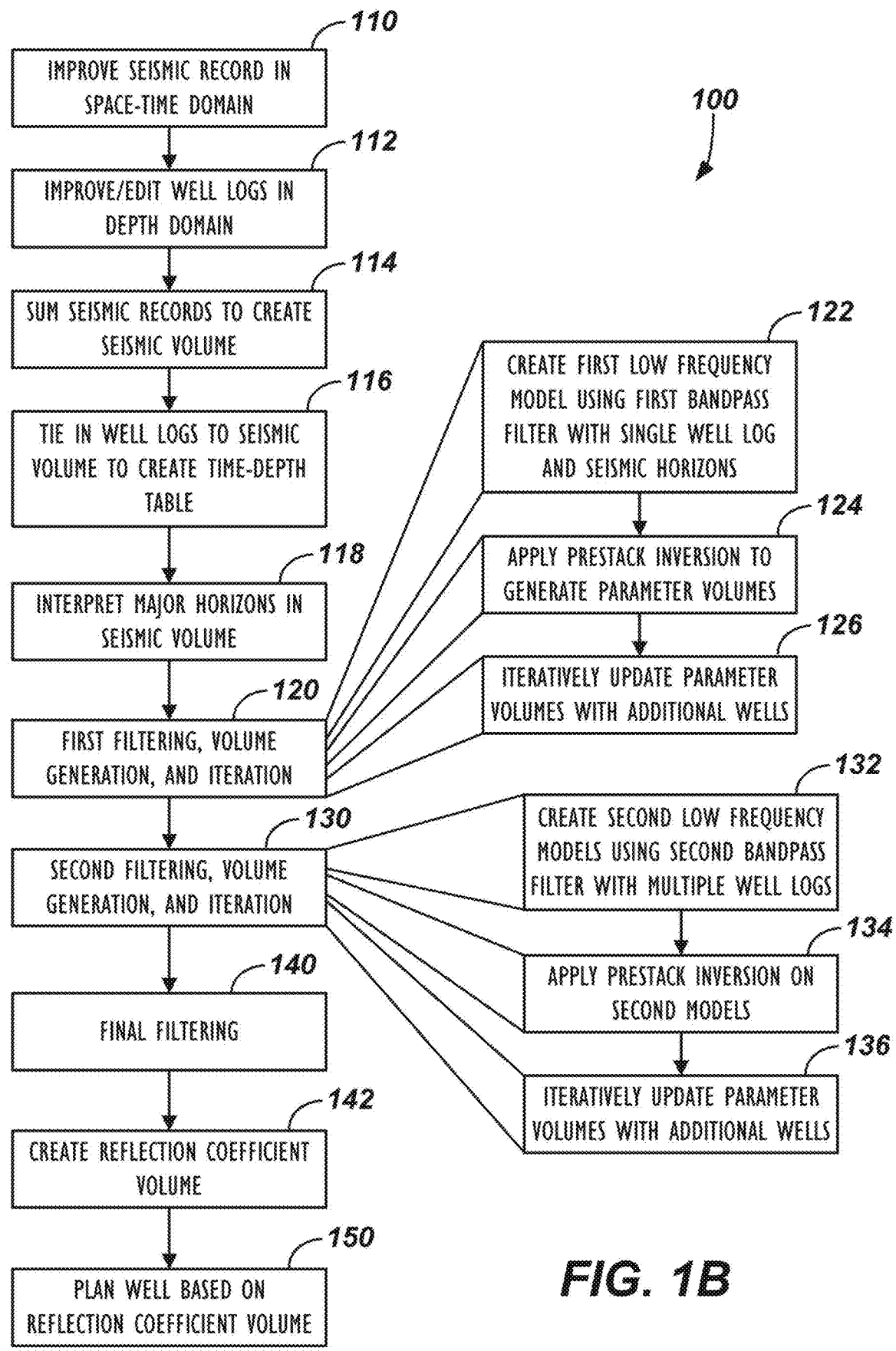
FIG. 1B illustrates the process of FIG. 1A in more detail.

FIG. 1B illustrates the process 100 according to the present disclosure in more detail. As noted above, the process 100 initially conditions the seismic data into a form for use in the inversion and conditions the well log data for use in a neural network processing. These initial steps can be performed in a number of ways. In one example, the seismic records can be improved in the space-time (x, t) domain (Block 110), and the well logs can be improved/edited in the depth domain (Block 112). The improved seismic records are summed to create a seismic volume (Block 114), and the improved well logs are tied to the seismic volume to create a time-depth table (Block 116). Finally, major horizons are interpreted in the seismic volume (Block 118).

The steps performed in Blocks 110-118 are used primarily to get the seismic data and well log data into a form where they can be used in the inversion/neural network processing. Other preparations could be performed. In any event, once the data is ready, the process 100 proceeds with its iterations of building a low frequency model with increased complexity as outlined previously. In the present example, the process 100 performs a first iteration set (Block 120) of filtering, generating volumes, and iterating on additional well logs followed by a second iteration set (Block 130) of filtering, generating volumes, and iterating on the additional well logs. On completion of these two iterations (Blocks 120, 130), final filtering is performed (Block 140) to create final output (Block 142).

Looking at the first iteration set (Block 120), the process 100 proceeds with creating a low frequency background model in Block 122 by applying a bandpass filter in the range 0/0-10/15 Hz to a single well log having the interpreted horizons (from Block 118) and tied by the time-depth table (from Block 116).

Figure 2C:
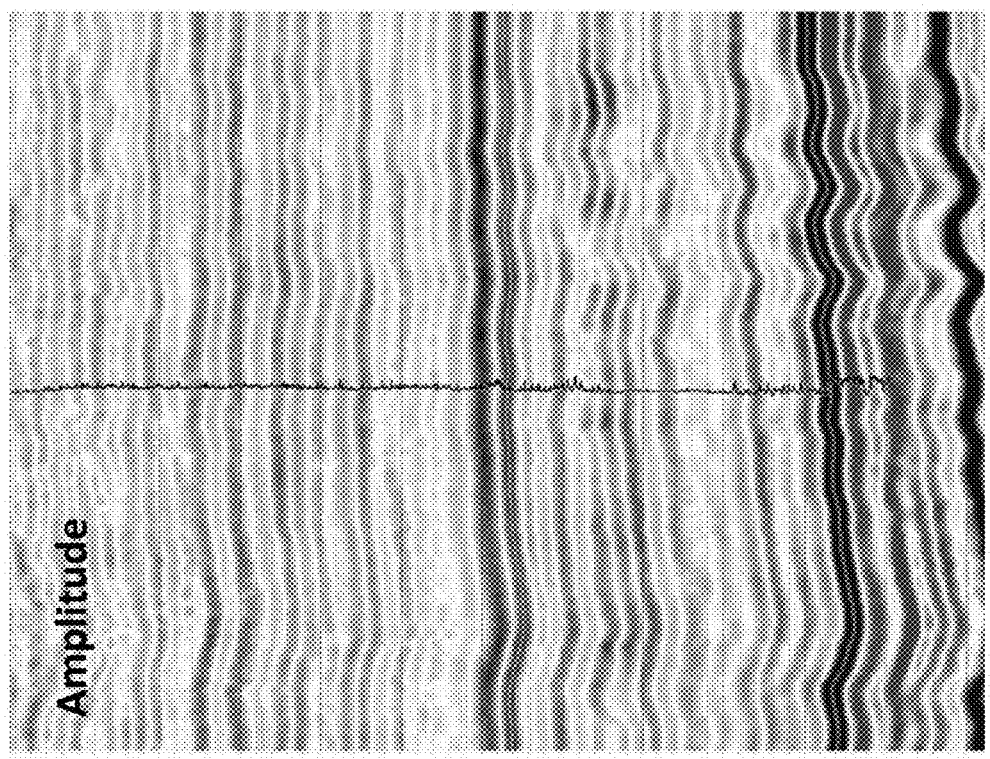
FIG. 2C illustrates a low frequency background model of impedance (Zp) from a single well in comparison to the seismic image.
Figure 2C:
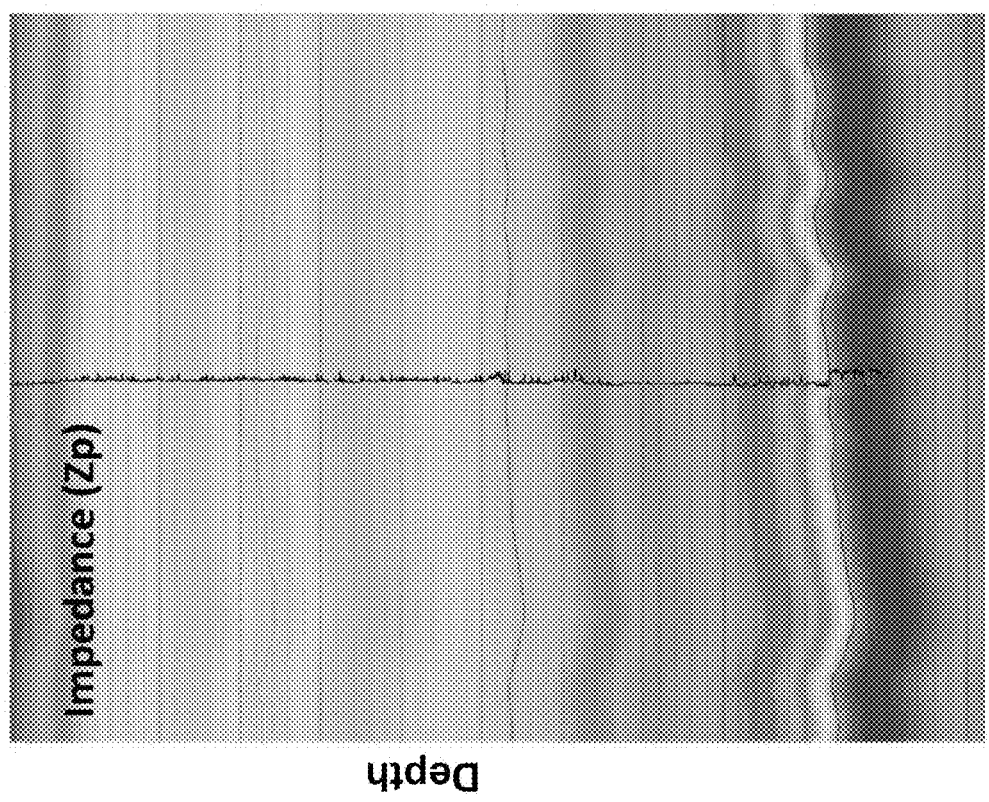

As an example, FIG. 2C shows a low frequency background model of impedance (Zp) from a single well. This model is shown filtered with a bandpass filter (e.g., 0-0-10-15-Hz model) and is depicted in comparison to the seismic image.

In next processing (Block 124), the process 100 generates parameter volumes (i.e., acoustic impedance, shear impedance, density, P-wave velocity, and S-wave velocity volumes) by applying pre-stack inversion on the seismic records from Block 110 using the model from Block 122.

Using these generated volumes from Block 124 and the well logs from Block 112, the process 100 iteratively refines the acoustic impedance, shear impedance, and density volumes using the supervised neural network processing with the several subsequent wells (Block 126).

Figure 2D:
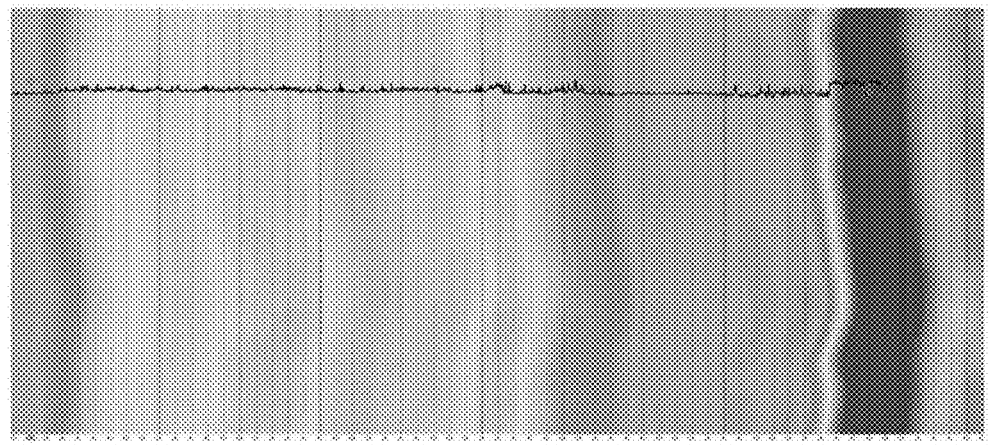
FIG. 2D illustrates an impedance (Zp) volume from the neural network processing, followed by a lower frequency background model filtered therefrom, followed by an 11×11 trace mix of the background model.
Figure 2D:
Figure 2D:
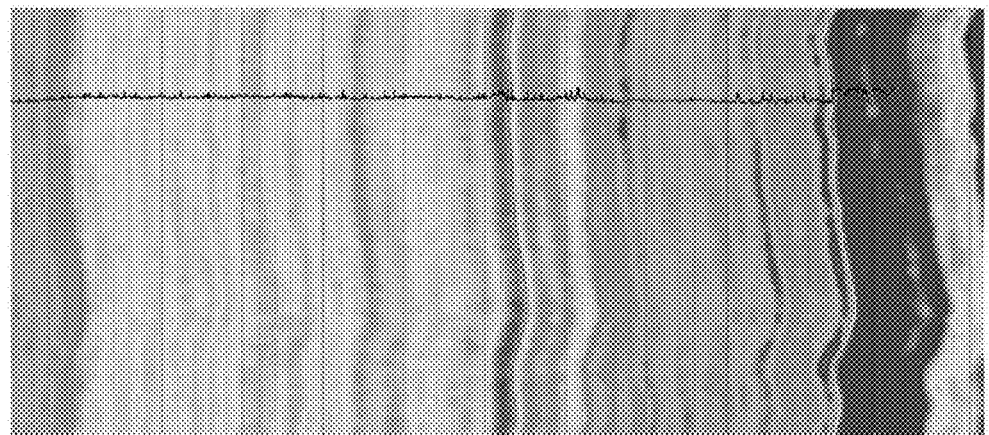

Following the first iteration set (Block 120), the process 100 proceeds with the second iteration set (Block 130). Here, the process 100 applies another low frequency bandpass filter 0/0-15/20 Hz on the refined volumes in Block 126 to create new low frequency models (Block 132). FIG. 2D illustrates an impedance (Zp) volume from the neural network processing of Block 126, followed by a lower frequency background model filtered therefrom from Block 132, and followed by an 11×11 trace mix of the background model.

In next processing (Block 134), the process 100 applies a pre-stack inversion on the seismic records using these created low frequency models (volumes) from Block 132. Then, using a supervised neural network iteratively with several well logs on the models from Block 134, the process 100 generates/refines the volumes for acoustic impedance, shear impedance, density, P-wave velocity, and S-wave velocity (Block 136). If correlations are low in these steps, the process 100 may loop through the neural network process again.

Figure 2E:
FIG. 2E illustrates a comparison of the seismic image relative to the acoustic impedance inversion volume after the initial inversion and after the final iteration inversion.
Figure 2E:
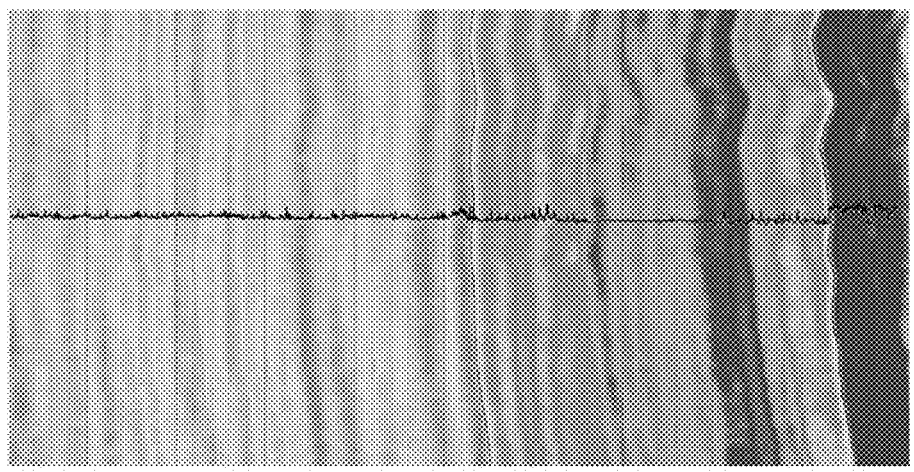
Figure 2E:
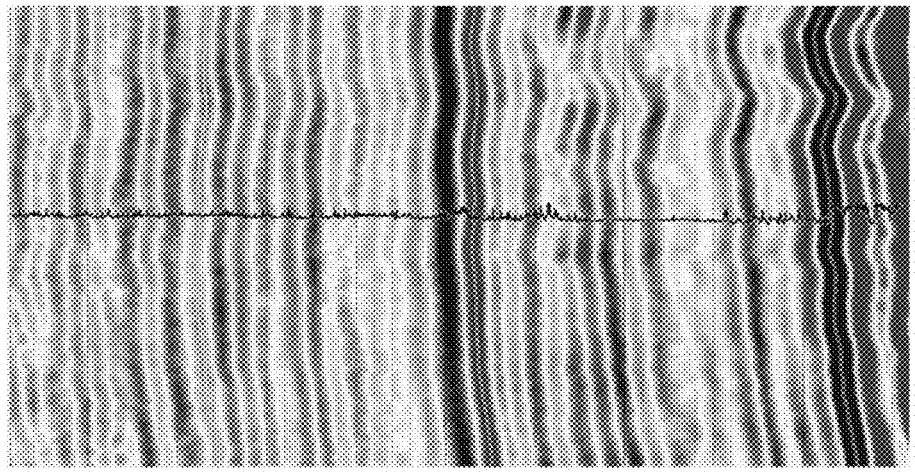

For illustration, FIG. 2E illustrates a comparison of the seismic image relative to the acoustic impedance inversion volume after the initial inversion of Blocks 120 and then after the final iteration inversion of Block 130.

At this point, the process 100 can complete its processing by performing a final filtering step (Block 140). For example, the process 100 applies a broad bandpass filter (0/0-90/110 Hz) to at least the acoustic impedance volume and/or the shear impedance volume from Block 136.

The various stated volumes are useful for imaging the formation, determining different types of facies, characterizing properties of the formation, and the like. However, the inversion volumes may be difficult to map. Most interpretation software relies on the use of peaks, troughs, or zero-crossings to map horizons from the seismic data. Inversion volumes do not have these peaks and troughs, which can make interpretation difficult. For this reason, the process 100 in FIG. 1B can create an additional seismic volume from the inversion volume (Block 142) by applying a reflection coefficient equation to the acoustic impedance volume or to the shear impedance volume. The reflection coefficient equation is:

$$RC = \frac{Zp_2 - Zp_1}{Zp_2 + Zp_1}$$

where Zp is acoustic impedance and RC is reflection coefficient. Details of the resulting reflection coefficient volume are discussed later.

In the end, the process 100 can plan aspects of a well for hydrocarbon exploration of the formation based on the imaging of the formation from at least the reflection coefficient volume (Block 150). A trajectory can be determined to drill a wellbore in the formation with a directional drilling system. For example, the horizontal section of the wellbore can be mapped based on the information from the reflection coefficient volume. A treatment of one or more zones can also be planned in the wellbore drilled along the trajectory to exploit hydrocarbons. A number of fracture completion stages can be planned. An organic rich shale facies in the formation can be determined from the enhanced geomechanical volumes, such as Young's modulus and Poisson ratio.

In summary, the iterative process 100 combines model-based pre-stack seismic inversion with supervised neural networks to develop high resolution rock property volumes. The pre-stack inversion can create volumes of rock properties and can enhance the higher frequency spectrum by removing the wavelet. To further increase the frequency content and correlation to log properties, a machine learning technique such as a multilayer feed-forward neural network can be used to match the seismic volumes to the well logs.

The pre-stack inversion combined with the neural networks can map out brittle and ductile zones in shale using Young's modulus and Poisson ratio. For example, a critical strain volume (Gc) can be created from Young's modulus and Poisson ratio and can be used to map the presence of fracture barriers or baffles that may affect pressure interaction between wells. A facies based seismic inversion can be used to derive estimates of horizontal stress and fracture initiation pressure gradients.

In addition to geomechanical volumes, the acoustic impedance volume is used to derive a high-resolution reflection coefficient (RC) seismic volume. This RC volume can have better resolution, frequency content, lateral continuity, and more precise ties to the well logs than standard seismic volumes alone. The RC volume is often more interpretable than the input-derived, full-stack volume traditionally used. For example, depth conversions using the RC volume can be more precise than depth conversion using standard seismic volumes, which leads to further refinement of development plans. Ultimately, the disclosed process 100 using the RC volume can lead to optimal placement of horizontal wells in unconventional reservoirs, such as those having organic rich shale facies.

Figure 2F:
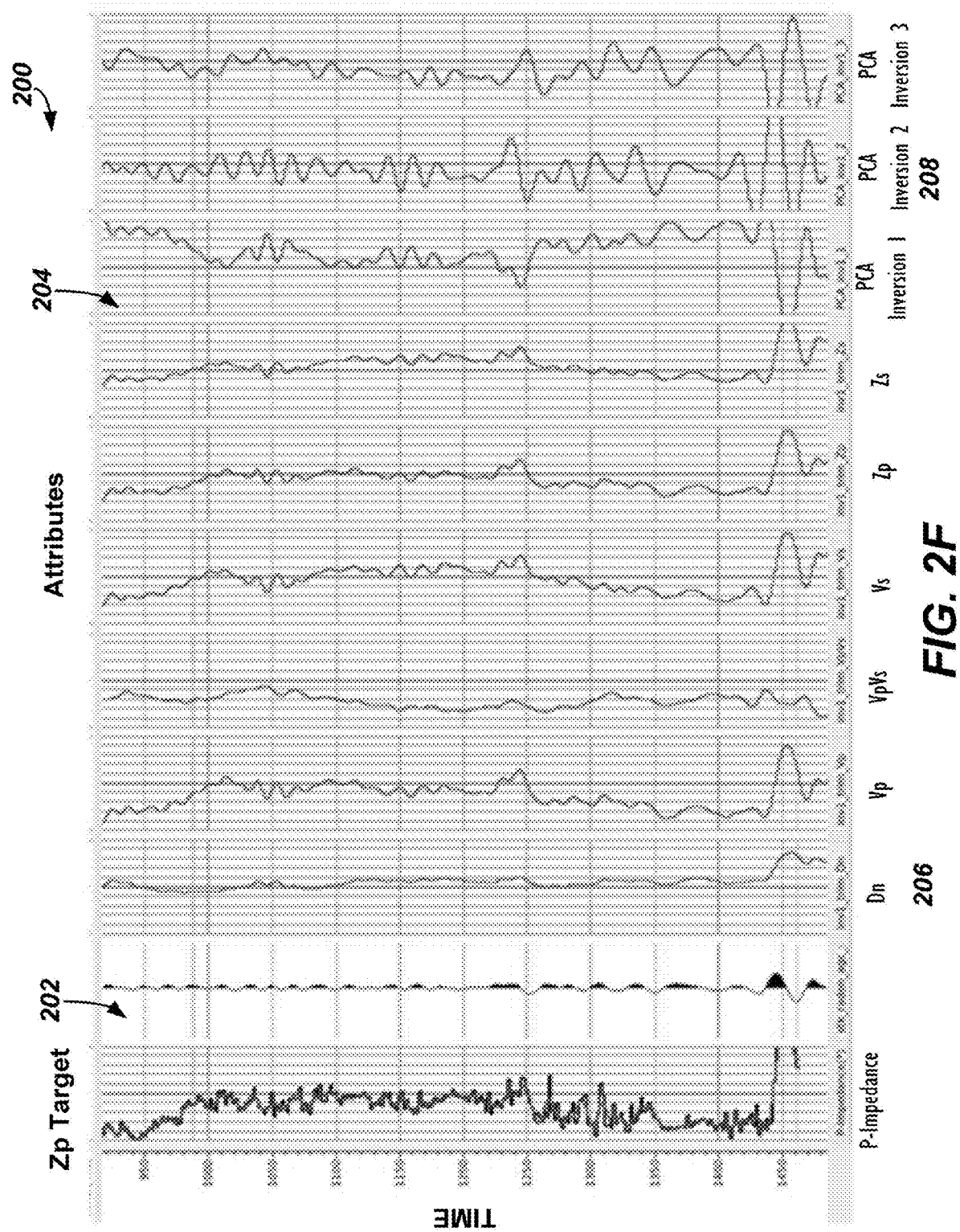
FIG. 2F shows an example of a well log and associated attributes to be used in training the disclosed process during iterations.
Figure 2G:
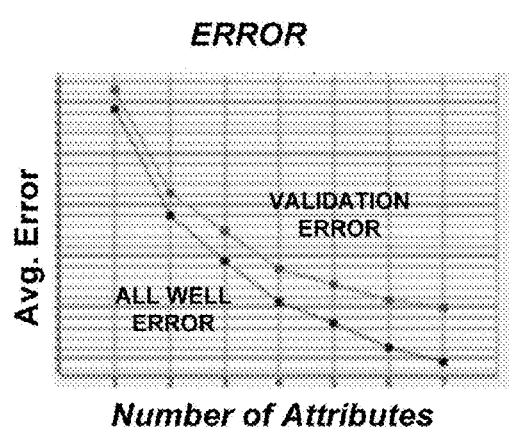
FIG. 2G illustrates a table of attributes with high correlation.
Figure 2H:
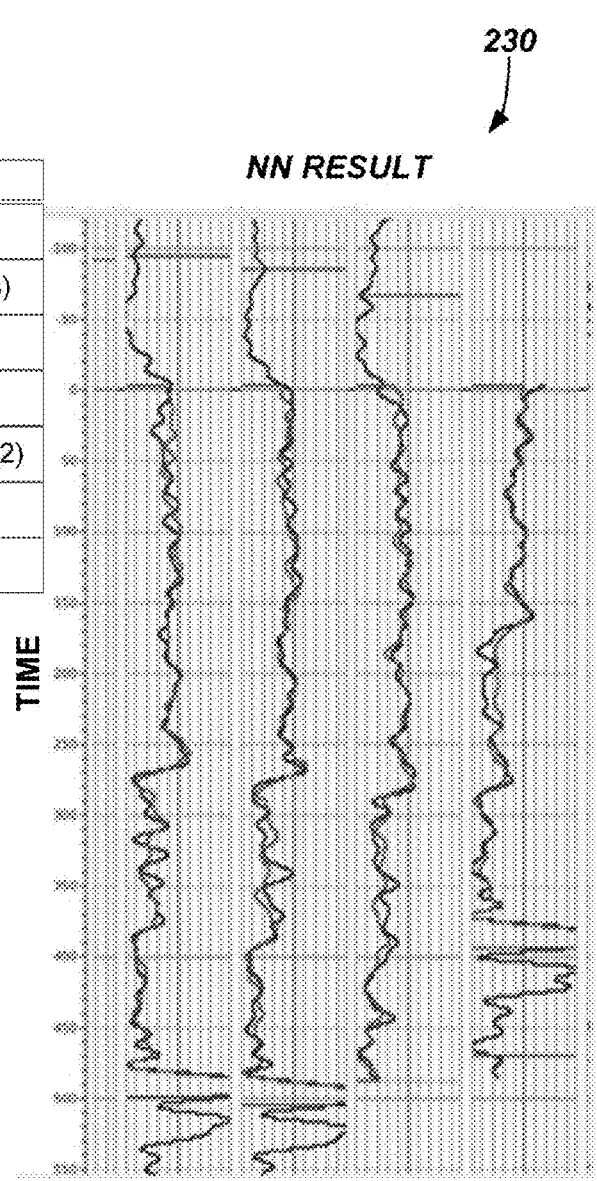
FIG. 2H illustrates example output of neural network processing according to the disclosed process.

Returning to some of further details related to the neural network processing, FIGS. 2F-2H show how a target well log (202: FIG. 2F) is filtered back to seismic frequencies and how mathematical operations and filters are applied during a step-wise linear regression to determine the best attributes (210: FIG. 2G) to use in the neural network processing to produce results (230: FIG. 2H). In particular, FIG. 2F shows an example of a well log 202 (Zp—acoustic impedance) and associated attributes 204 to be used in training the disclosed process 100 during the iterations (Block 120, 130) discussed previously.

In addition to the five seismic inversion volumes 206 in the attributes, principle component analysis (PCA) is performed, and the top five eigenvalues are used to create PCA volumes 208. Bandlimited filters are also applied to each of the volumes, yielding around eighty (80) different attributes. Mathematical operations including inverse, square, log, and square root are also applied to each of these attributes yielding three-hundred and twenty (320) different attributes to use in the analysis.

Some of these attributes may be more useful than others in predicting the well log. As shown in FIG. 2G, attributes 210 that are most useful in predicting the well log are determined. This can be done by using a step-wise linear regression to find the best attributes that correlate to the well log data as shown in FIG. 2G. These best attributes 210 in FIG. 2G are then used as input into the neural network (NN) with the well logs used as a target training set. The output 230 of the neural network processing is shown in red in FIG. 2H, overlaying the filtered logs in black.

In summary, the neural network processing identifies best attributes using step-wise linear regression. The inversion results are fine tune with well logs using the neural networks and linear regression. Coefficients are derived to match the seismic attributes to the well logs. Different filters and mathematical operations are applied to target well logs to derive best relationships. The processing steps through different attributes to find the top ones that correlate the best. In the end, the machine learning further increases resolution and property estimation by training the neural network using the best attributes defined by the step-wise linear regression.

In the Blocks 126, 136 of the iterations 120, 130, the neural network is used to create a volume of the well property using the seismic inversion volumes and associated attributes. A multilayer neural network as discussed may work well and can give higher frequencies, although the results may sometimes be spatially noisy. A probability neural network may also work, but may be generally in a slightly lower frequency and may take longer to complete. Other types of supervised neural networks could also be used.

In the Blocks 126, 136, the neural network is used to match the single well inversion results to the well logs in the survey with acoustic impedance, shear wave impedance, and density logs creating an acoustic impedance volume, a shear impedance volume, and a density volume. A low pass filter is then applied to these volumes to create new background models with slightly higher frequency content than initially given with the single-well model. Another iteration of pre-stack inversion is done, and the steps in Blocks 126, 136 are then repeated through further neural network enhancement. After the P-wave volume, S-wave volume, and density volume are created in this process, rock property volumes such as Young's modulus, Poisson ratio, Brittleness, critical strain, and others can also be calculated. These volumes may also go through enhancement through neural network processing.

C. Results of the Processing Technique

Figure 3A:
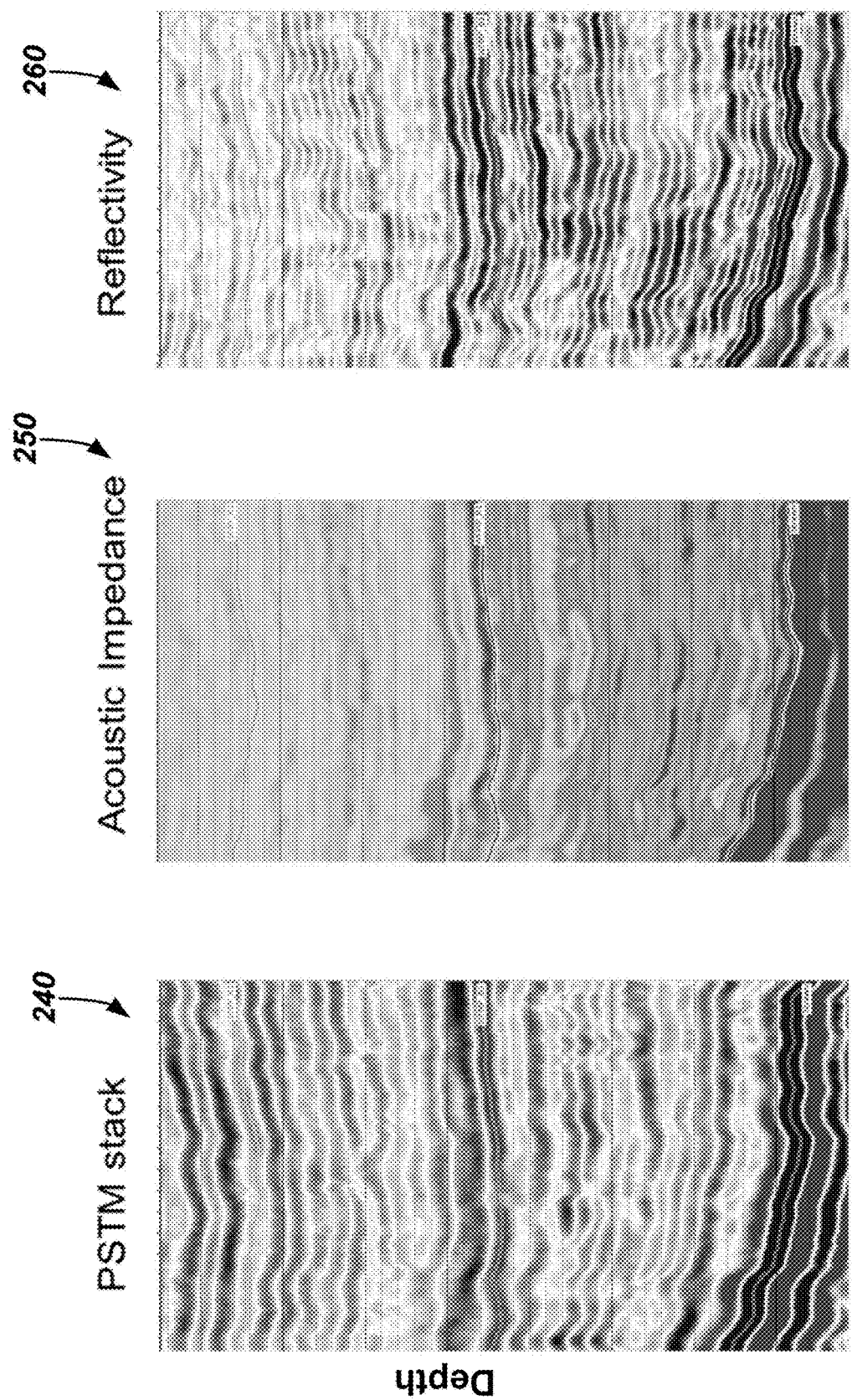
FIG. 3A shows seismic sections for pre-stack time-migrated stack, acoustic impedance, and reflectivity.
Figure 3B:
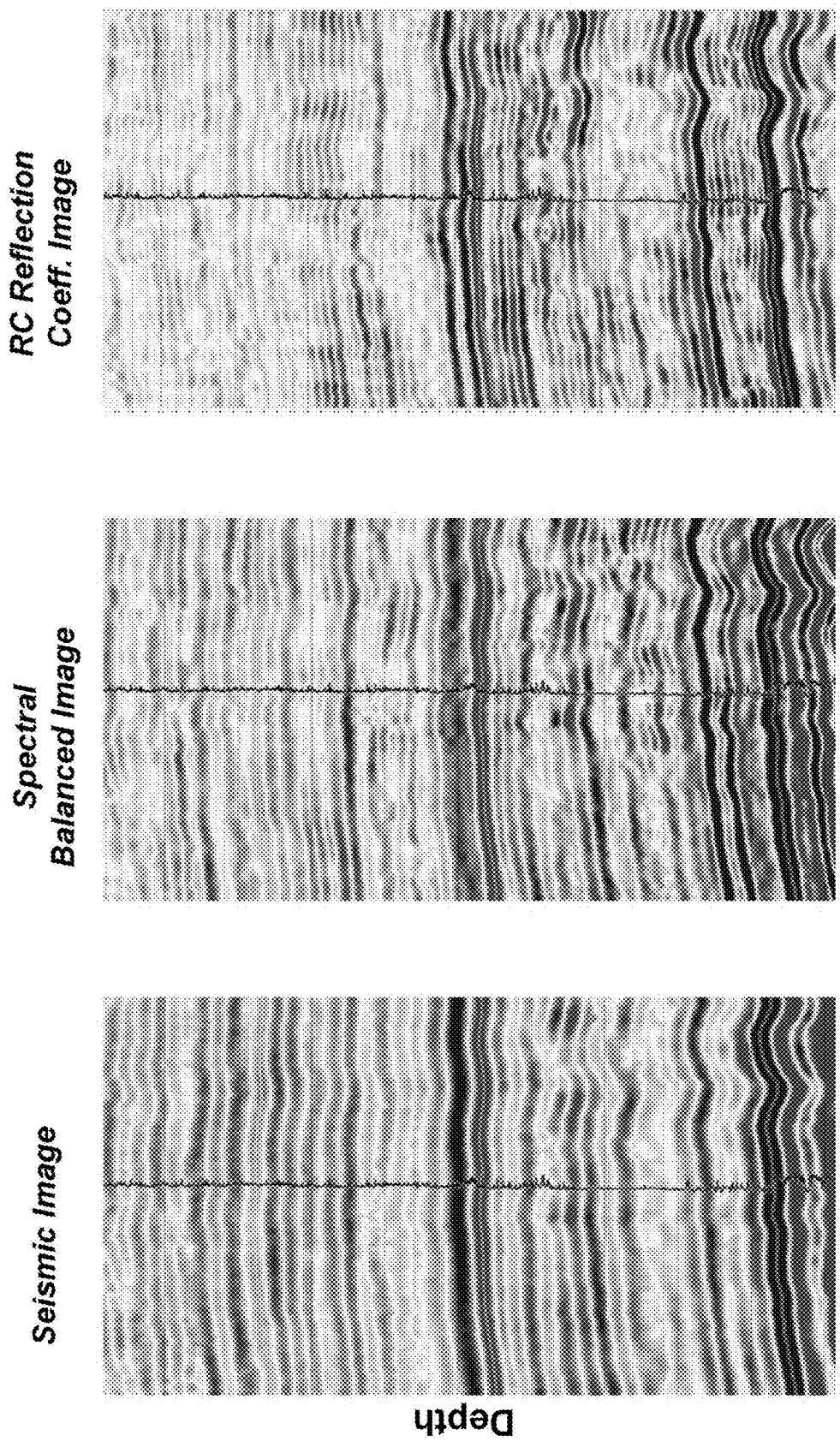
FIG. 3B shows comparisons between seismic sections and reflective coefficient sections.

FIG. 3A shows a seismic section 240 from a 3D survey calculated from the pre-stack time-migrated gathers. A second section 250 shows the acoustic impedance derived from the disclosed technique of model-based pre-stack inversion followed by multi-linear regression and supervised neural network processing as described above. The third section 260 in FIG. 3A shows the result of the calculation of the reflection coefficient on the acoustic impedance volume. This section 260 is referred to here as a reflection coefficient (RC) section or RC volume. For further comparison of the seismic volumes, FIG. 3B illustrates a seismic section 240, a spectral balanced section 250, and a reflection coefficient (RC) section 260 of a seismic volume.

As can be seen in the reflection coefficient section 260, the frequency content is increased, and the lateral continuity is improved when compared to the original PSTM section 240. In fact, certain features of a reservoir can be more accurately mapped in the reflection coefficient section 260 from the reflection coefficient volume. For example, a horizon interpreted using the PSTM section 240 may be better interpreted using the reflection coefficient section 260.

Because the volumes go through the neural network process to fit the well logs, the reflection coefficient volume for this section 260 also ties to the information pertaining to the well logs better. As has been found, the reflection coefficient volume for this section 260 creates a more interpretable seismic volume than traditional techniques, such as spectral balancing followed by spatial prediction for signal/noise separation (FXY decon) on the final pre-stack time migration (PSTM) stack.

Using the disclosed techniques with reflectors being better imaged, depth conversion can be more accurate. As will be appreciated, this can have a number of practical benefit in the exploration, drilling, and management of a reservoir. For example, horizontal wells can be placed more effectively using the reflection coefficient volume.

Figure 4A:
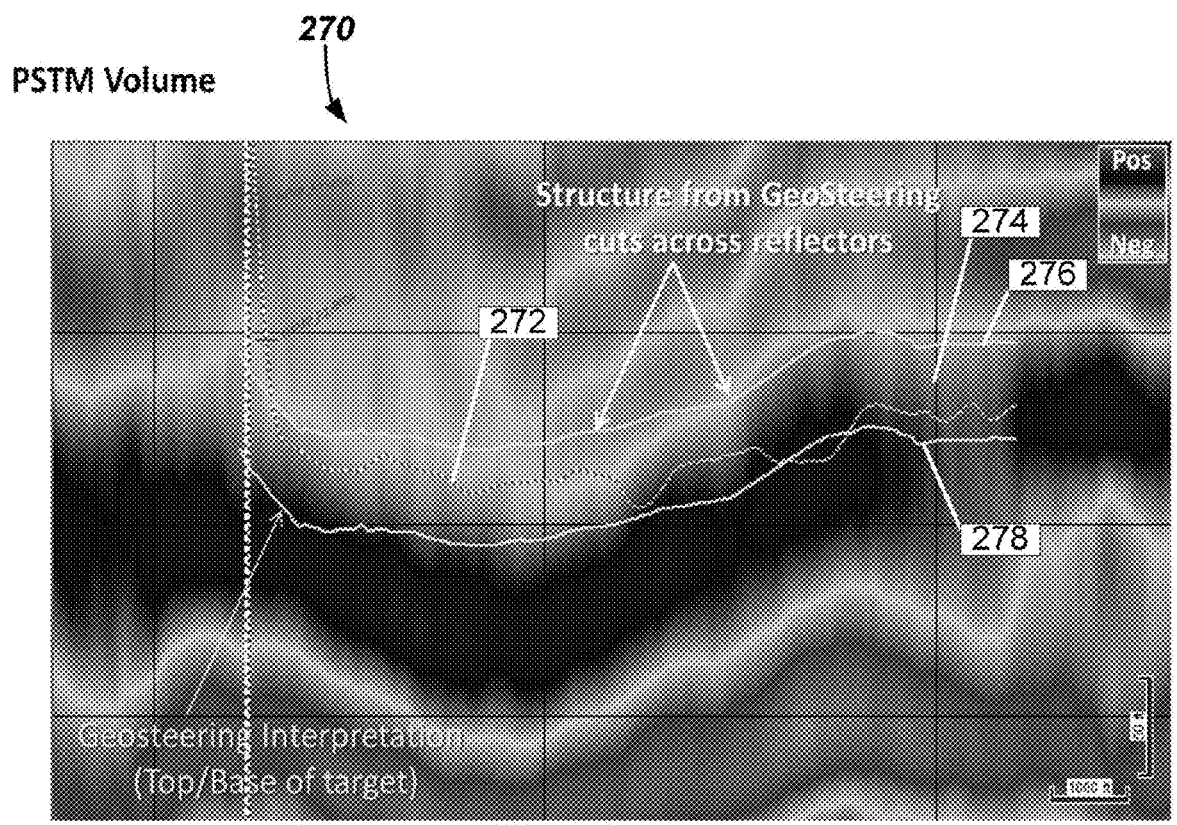
FIG. 4A shows a geo-steered well overlying a seismic stack derived from pre-stack time-migrated gathers.
Figure 4B:
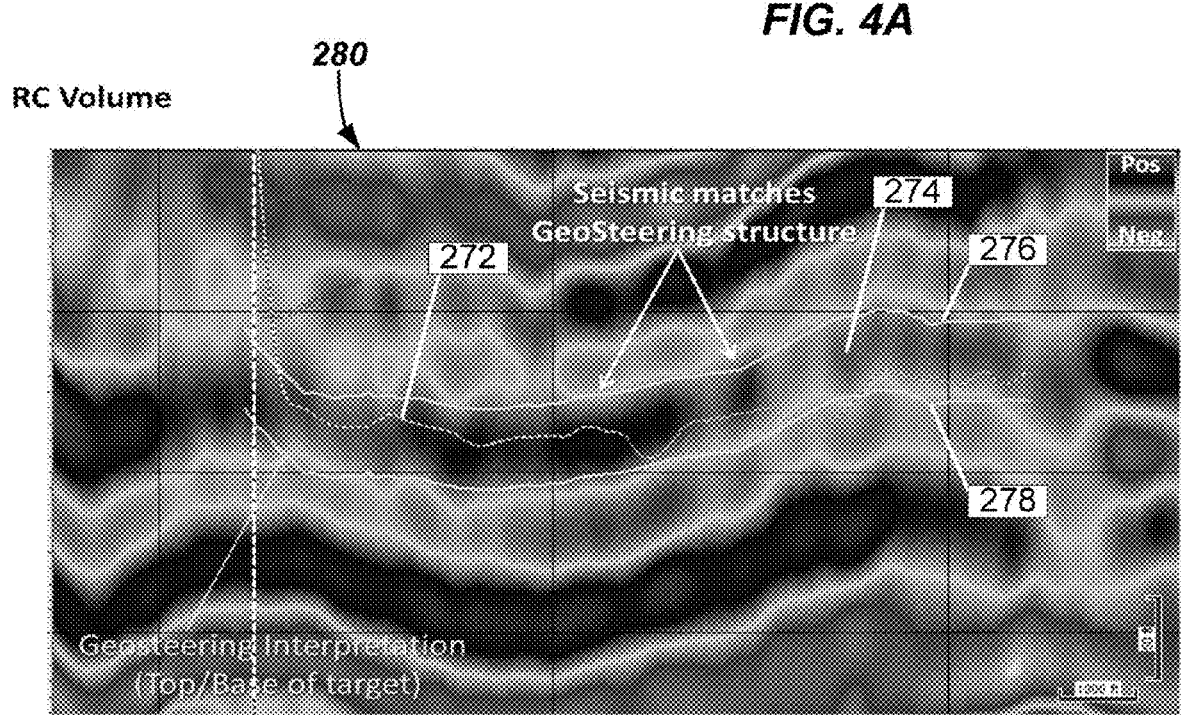
FIG. 4B shows a horizontal well model overlaid on a reflection coefficient section produced according to the present disclosure.

FIG. 4A shows an example of a problematic horizontal well 272 drilled using conventional seismic, which can be more accurately explained using a reflection coefficient depth volume as shown in FIG. 4B. As shown in FIG. 4A, for example, the horizontal well 272 that was geo-steered overlying a graphed section 270 from the seismic stack derived from the pre-stack time-migrated gathers. As is known, geosteering involves steering a well while drilling according to a well plan based on well data and seismic interpretation. The steering equipment near the drill bit has a logging-while-drilling (LWD) tool to make measurements used in directing the drilling. As the well is being drilled, for example, a gamma ray log acquired from the LWD tool is shifted and squeezed to match a gamma ray log acquired separately from a vertical pilot well. This matching creates a model of the horizontal path to help the drilling equipment keep the drilled well in a desired zone.

As shown in FIG. 4A, the modelled path 274 is laid out with a top of target (TOT) margin 276 and bottom of target (BOT) margin 278. The target is where the horizontal well is planned to be placed, such as a brittle organic shale. Preferably, the resulting model path 274 actually matches the depth-converted seismic volume and lies along a single reflector. As shown in FIG. 4A, this is not the case. Instead, the geosteering model well 274 clearly crosses seismic reflections so that the geosteering model 274 in margins 276, 278 in FIG. 4A disagrees with the original depth seismic volume.

As shown in FIG. 4B, for example, the horizontal well and geosteering model is overlaid on a section 280 of a reflection coefficient volume produced according to the present disclosure. The seismic data was inverted to create a reflection coefficient volume, and the depth conversion was done using structural time maps from this higher resolution reflection coefficient volume. The geo-steering model now matches the seismic structure of the formation much better and provides confidence in the interpretation. Future wells can be planned more effectively using this reflection coefficient volume. In fact, it has been found that depth conversion accuracy can be increased as much as 40% using the reflection coefficient volume in some areas.

In addition to the RC volume, the rock property volumes can be useful in refining the completion programs and well spacing, and they can be useful in understanding well interaction. As already noted, one volume that can be used is a critical strain energy volume (Gc), which is a function of Young's modulus and Poisson ratio. From these volumes, for example, a facies volume can be produced to show frac barriers interpreted from areas with higher Young's modulus and from the Gc influence of pressure communication between completed wells.

D. Conclusion

The disclosed techniques can be effective in creating rock property volumes through the use of model-based, pre-stack inversion and supervised neural network processing. The acoustic impedance volume derived using this method can be used to derive a reflection coefficient volume that has better resolution, lateral continuity, and ties to well-related data more precisely than standard seismic techniques alone. Depth conversion derived using the reflection coefficient volume can be more precise than depth conversion using standard seismic techniques.

The single-well model followed by neural network processing can be useful where all the wells in the survey are fairly similar to some designable extent. If there is a large lateral facies change, such as a layered local carbonate debris flows in one area of the 3D survey, the single-well model may not work as well so that a multi-well low frequency model may be more appropriate. Complex trace attributes applied to the volumes can increase the correlation on the well log analysis, but may tend to introduce spatial noise on the final 3D volumes. Bandlimited filter attributes applied to the inversion volumes are more effective.

An acoustic impedance volume derived using this method can be used to derive a reflection coefficient volume that has better resolution, lateral continuity, and more precise well ties than standard seismic alone. Depth conversions using the reflection coefficient volume is more precise than depth conversion using standard seismic, which leads to better well plans and placement of laterals.

Some portions of the detailed description were presented in terms of processes, programs, and workflows. These processes, programs and workflows are the means used by those skilled in the data processing arts to most effectively convey the substance of their work to others skilled in the art. A process or workflow is here, and generally, conceived to be a self-consistent sequence of steps (instructions) contained in memory and run or processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

Figure 5:
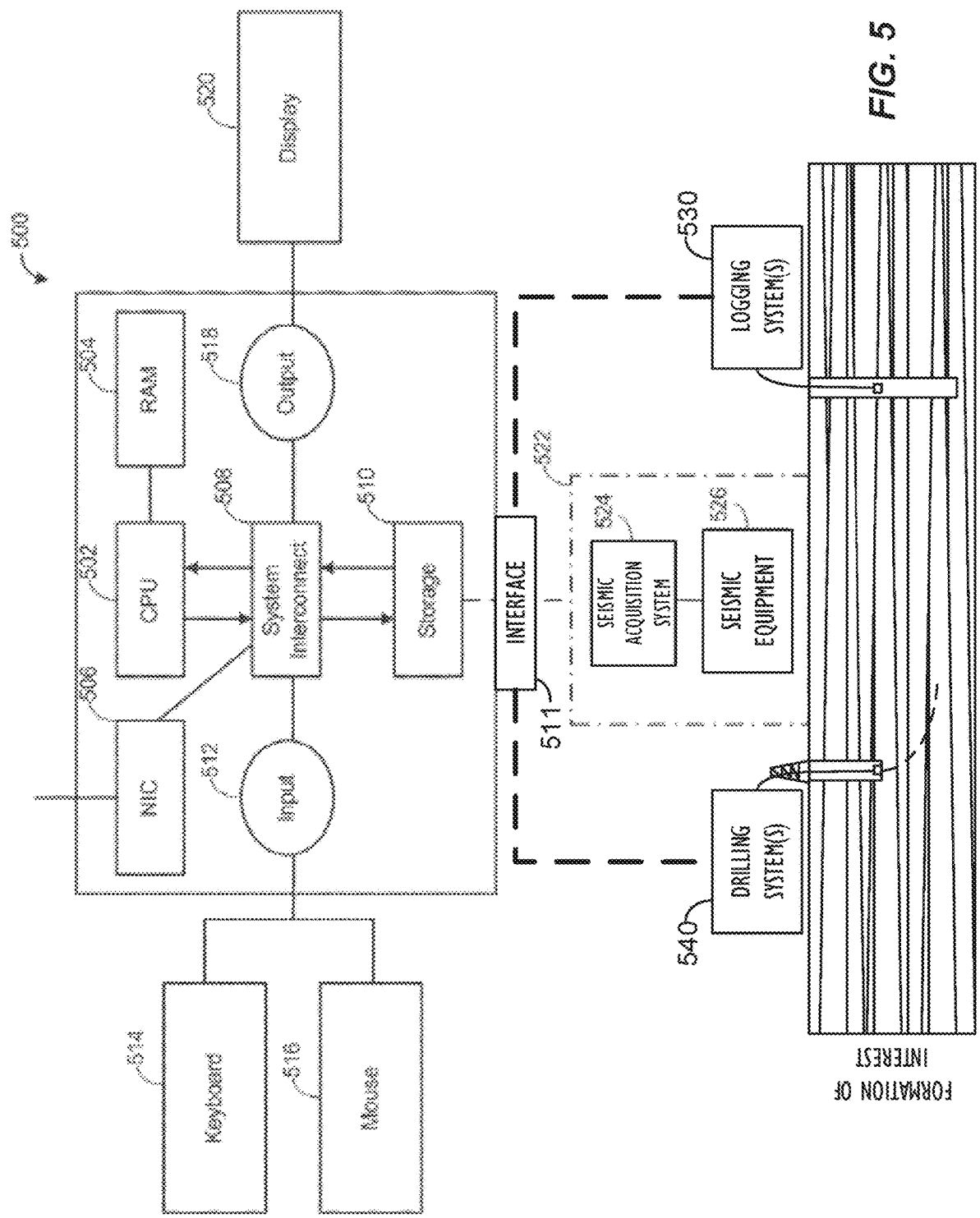
FIG. 5 illustrates a block diagram of a system that can be used to implement the analysis techniques described herein.

The subject matter of the present disclosure also relates to an apparatus or system for performing the operations herein. This apparatus or system may be specially constructed for the required purposes, or it may comprise a general-purpose computer and other equipment. As shown in FIG. 5, a processing unit 520, such as a general-purpose computer, is operationally coupled to a seismic system 522, a logging system(s) 530, and a drilling system(s) 540. The processing unit 520 may actually be part of the seismic system 522.

The seismic system 522 includes a seismic acquisition system 524 and seismic equipment 526. The seismic equipment 526 can include any of the available devices for generating and recording seismic information of a formation of interest. Such devices include geophones, hydrophones, vibration sources, accelerometers, and the like. The seismic acquisition system 524 controls the seismic equipment 526 in the generation and recording of seismic information and organizes and stores the information for processing.

The logging system 530 includes any of the available devices for generating and recording log information of a formation of interest. For example, the logging system 530 may use logging tools, sondes, and the like in a wellbore to log energy responses (acoustic, nuclear, resistivity, and other forms of responses) imaging the formation (i.e., delineating various strata, permeabilities, beds, hydrocarbon bearing zones, etc.).

The drilling system 540 includes any of the available devices for drilling a wellbore in a formation of interest. For example, the drilling system 530 may use directional drilling tools, geosteering equipment, sensors, and the like for drilling a wellbore according to a planned trajectory determined according to the techniques disclosed herein. As noted above, for example, geosteering involves steering a well while drilling according to a well plan based on well data and seismic interpretation. The steering equipment near the drill bit has a logging-while-drilling (LWD) tool to make measurements used in directing the drilling. As the well is being drilled, for example, a gamma ray log acquired from the LWD tool is shifted and squeezed to match a gamma ray log acquired separately from a vertical pilot well. This matching creates a model of the horizontal path to help the drilling equipment keep the drilled well in a desired zone.

As shown, the trajectory of the wellbore may include a horizontal section. The drilling system 540 may further include equipment for treating and fracturing the formation along the wellbore once drilled. Thus, the drilling of the wellbore in a desired zone to exploit hydrocarbons is planned in anticipation of later treatment and fracturing of the formation around the wellbore.

A programmable storage device has program instructions stored thereon for causing a programmable control device to perform the techniques of the present disclosure. For example, the computer 520, as a programmable control device, is selectively activated or reconfigured by a computer program having program instructions stored in the computer 520. Such a computer program may be stored in a programmable storage device, such as any type of computer readable storage medium, floppy disks, optical disks, CD-ROMs, an magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

The computer 520 includes an interface 511 for receiving and sending information with the other systems. For example, the interface 511 can receive seismic records of the seismic equipment imaging the formation and can receive well logs of logging equipment imaging the formation intersected by the wells. The interface 511 can also communicate information for directional drilling to the drilling system 540.

Furthermore, the computer 520 referred to in the specification may include a single processor such as 502, or may be architectures employing multiple processor designs for increased computing capability in processing seismic information according to the techniques disclosed herein.

The systems and techniques described herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language, software application, or other system. It will be appreciated that a variety of languages, applications, systems, etc. may be used to implement the teachings of the present invention as described herein, and any references to specific languages, applications, or systems are provided only for purposes of enabling and disclosing the best mode of practicing the invention.

Further details related to the disclosed subject matter can be found in the following references, each of which is incorporated herein by reference in its entirety:

Bodziak, R., Clemons, K., Stephens, A., and Meek R., 2014, "The role of seismic attributes in understanding the hydraulically fracturable limits and reservoir performance in shale reservoirs: An example from the Eagle Ford Shale, south Texas," AAPB Bulletin, 98:11:2217-2235

Newgord*, M. Mediani, A. Ouenes, and P. O'Conor (2015), "Bakken Well Performance Predicted from Shale Capacity," Unconventional Resources Technology Conference, San Antonio, Tex., 20-22 Jul. 2015: pp. 2591-2598.

Hongzhuan Ye, Lowell Waite, Robert Meek, Robert Bodziak, and Evan Kelly (2015), "Improving Wolfcamp B3 Drilling From Geologic Analysis," Unconventional Resources Technology Conference, San Antonio, Tex., 20-22 Jul. 2015: pp. 2052-2061.

Hampson, D., Schuelke, J., Quirein, J., 2001, "Use of multiattribute transforms to predict log properties from seismic data," Geophysics, Vol. 66, No. 1, P220-236.

Hampson, D. P., and B. H. Russell, 2005, "Simultaneous inversion of pre-stack seismic data," 75th Annual International Meeting, SEG, Expanded Abstracts, 1633-1637.

Stephens, A.; Meek, R. A., and Clarke, P. 2011. 6316 Mining Eagle Ford rock properties data from 3D seismic in South Texas, using pre-stack inversion and Neural Net technology. 17th Annual RMAG/DGS 3D Seismic Symposium, Denver, USA.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the disclosed subject matter. Therefore, it is intended that the disclosed subject matter include all modifications and alterations to the full extent that they come within the scope of the disclosed embodiments or the equivalents thereof.

What is claimed is:

1. A method implemented with processing equipment of imaging a formation for hydrocarbon exploration, the formation having a plurality of wells therein, the method comprising:
    obtaining seismic records of seismic equipment imaging the formation;
    obtaining well logs of logging equipment imaging the formation intersected by the wells;
    tying the well logs to the seismic records;
    in a first iteration, filtering one of the well logs, generating first volumes imaging a parameter of the formation using the seismic record and a first model created from the filtered well log, and iteratively updating the first volumes using the well logs of additional ones of the wells;

in a second iteration, filtering the updated first volumes, generating second volumes imaging a parameter of the formation using the seismic record and second models created from the filtered first volumes, and iteratively updating the second volumes using the well logs of the wells;

calculating a reflection coefficient volume from at least an impedance volume of the updated second volumes; and planning a stage of the hydrocarbon exploration of the formation based on the imaging of the formation from at least the reflection coefficient volume.

2. The method of claim 1, wherein obtaining the seismic records comprises conditioning the seismic records in a space-time (x, t) domain.

3. The method of claim 1, wherein obtaining the seismic records comprises creating a seismic volume by summing the seismic records.

4. The method of claim 1, wherein obtaining the well logs comprises editing the well logs in a depth domain.

5. The method of claim 1, wherein tying the well logs to the seismic record comprises matching properties of the well logs acquired in depth with properties of the seismic records acquired in time.

6. The method of claim 5, wherein matching the properties comprises creating a time-depth table of the well logs tied to the seismic records.

7. The method of claim 5, wherein tying the well logs to the seismic records comprises interpreting major horizons in the seismic records.

8. The method of claim 1, wherein in the first iteration, filtering one of the well logs and generating the first volumes using the seismic record and the first model created from the filtered well log comprises:

creating the first model as a first low frequency background model by applying a first bandpass filter to one of the well logs; and generating the first volumes each imaging a parameter of the formation by applying prestack inversion to the seismic records using the first model.

9. The method of claim 8, wherein creating the first low frequency background model comprises applying the bandpass filter in a range 0/0-10/15 Hz on the one well log detailed with interpreted horizons and time-depth information.

10. The method of claim 1, wherein the first volumes are selected from the group consisting of acoustic impedance, shear impedance, density, P-wave velocity, and S-wave velocity volumes.

11. The method of claim 1, wherein iteratively updating the first volumes using the additional ones of the well logs comprises iteratively refining the first volumes using neural network processing with the additional well logs.

12. The method of claim 1, wherein in the second iteration, filtering the updated first volumes and generating the second volumes imaging a parameter of the formation using the seismic record and the second models created from the filtered first volumes comprises:

creating the second models as second low frequency background models by applying a second bandpass filter to the updated first volumes; and generating the second volumes each imaging a parameter of the formation by applying prestack inversion to the seismic records using the second models.

13. The method of claim 12, wherein creating the second low frequency background models by applying a second bandpass filter to the updated first volumes comprises applying the second bandpass filter in a range of 0/0-15/20 Hz on the updated first volumes.

14. The method of claim 1, wherein iteratively updating the second volumes using additional ones of the well logs comprises refining the second volumes for acoustic impedance, shear impedance, density, P-wave velocity, and S-wave velocity by iteratively using a neural network with the additional well logs.

15. The method of claim 1, wherein calculating the reflection coefficient volume comprises applying a broad bandpass filter in a range of 0/0-90/110 Hz to at least an impedance volume of the second volumes.

16. The method of claim 1, wherein calculating the reflection coefficient volume comprises applying a reflection coefficient equation to at least the impedance volume including an acoustic impedance volume or a shear impedance volume.

17. The method of claim 16, wherein the reflection coefficient equation is defined by:

$$RC = \frac{Zp_2 - Zp_1}{Zp_2 + Zp_1}$$

wherein Zp is acoustic impedance and RC is the reflection coefficient.

18. The method of claim 1, wherein planning the stage of the hydrocarbon exploration of the formation based on the imaging of the formation from at least the reflection coefficient volume comprises determining facies of the formation from the geomechanical volumes.

19. The method of claim 1, wherein planning the stage of the hydrocarbon exploration of the formation based on the imaging of the formation from at least the reflection coefficient volume comprises determining a trajectory to drill a wellbore in the formation with a directional drilling assembly.

20. The method of claim 19, wherein planning the stage of the hydrocarbon exploration of the formation based on the imaging of the formation from at least the reflection coefficient volume further comprises planning a treatment of one or more zones of the wellbore drilled along the trajectory to exploit hydrocarbons.

21. A programmable storage device having program instructions stored thereon for causing a programmable control device to perform a method of imaging a formation for hydrocarbon exploration according to claim 1.

22. A system for of imaging a formation for hydrocarbon exploration, the formation having a plurality of wells therein, the system comprising:

an interface receiving seismic records of seismic equipment imaging the formation and receiving well logs of logging equipment imaging the formation intersected by the wells; and processing equipment in operable communication with the interface, the programmable control device configured to:

tie the well logs to the seismic records;

in a first iteration, filter one of the well logs, generate first volumes imaging a parameter of the formation using the seismic record and a first model created from the filtered well log, and iteratively update the first volumes using the well logs of additional ones of the wells;

in a second iteration, filter the updated first volumes, generate second volumes imaging a parameter of the formation using the seismic record and second models created from the filtered first volumes, and iteratively update the second volumes using the well logs of the wells;

calculate a reflection coefficient volume from at least an impedance volume of the updated second volumes; and plan a stage of the hydrocarbon exploration of the formation based on the imaging of the formation from at least the reflection coefficient volume.

23. The system of claim 22, further comprising logging equipment obtaining the well logs imaging the formation intersected by the wells.

24. The system of claim 22, further comprising seismic equipment obtaining the seismic records imaging the formation.

25. The system of claim 22, further comprising a directional drilling assembly drilling a trajectory of a wellbore in the formation.

* * * * *